United States Patent [19]

Dupuy et al.

[11] Patent Number: 5,582,895
[45] Date of Patent: Dec. 10, 1996

[54] INTEGRALLY MOLDED GREENHOUSE TRIM

[75] Inventors: Ronald E. Dupuy; Keith E. Wilson, both of Wabash; Walter D. Hunnicut; Wayne A. Smith, both of Fort Wayne, all of Ind.

[73] Assignee: GenCorp Inc., Fairlawn, Ohio

[21] Appl. No.: 504,162

[22] Filed: Jul. 19, 1995

[51] Int. Cl.6 .................................................. B60R 13/06
[52] U.S. Cl. ...................... 428/122; 49/490.1; 428/358
[58] Field of Search .................................. 428/122, 358; 49/490.1

[56] References Cited

U.S. PATENT DOCUMENTS

| | | | |
|---|---|---|---|
| 4,616,446 | 10/1986 | Okamoto | 49/441 |
| 4,652,475 | 3/1987 | Haney et al. | 428/36.91 X |
| 4,654,262 | 3/1987 | Alonso | 428/353 X |
| 4,913,976 | 4/1990 | Brooks et al. | 428/122 X |
| 5,003,792 | 4/1991 | Mesnel et al. | 49/479.1 X |
| 5,013,379 | 5/1991 | Brooks et al. | 156/244.11 |
| 5,014,464 | 5/1991 | Dupuy et al. | 428/122 X |
| 5,086,588 | 2/1992 | Nakano et al. | 49/441 |
| 5,199,760 | 4/1993 | Vering | 296/146.16 |
| 5,199,761 | 4/1993 | Dannecker et al. | 296/146.16 |
| 5,294,168 | 3/1994 | Kronbetter | 296/146.16 |
| 5,311,702 | 5/1994 | Moore | 49/495.1 |
| 5,345,717 | 9/1994 | Mori et al. | 49/404 |
| 5,356,194 | 10/1994 | Takeuchi | 296/146.9 |
| 5,358,764 | 10/1994 | Roberts et al. | 428/122 X |
| 5,367,831 | 11/1994 | Gunkel | 49/478.1 |
| 5,423,147 | 6/1995 | Dupuy | 49/490.1 |

Primary Examiner—Henry F. Epstein
Attorney, Agent, or Firm—Robert F. Rywalski; Thomas A. Meehan

[57] ABSTRACT

A combined glassrun, greenhouse trim (10) for the window opening of an automotive vehicle comprising an extruded or co-extruded, polymeric glassrun (12) and a greenhouse trim (14). The greenhouse trim (14) is injection molded from a polymeric material against a surface of a flange portion (22) of the glassrun (12). The organic materials selected for the glassrun (12) and the greenhouse trim (14) are such that the greenhouse trim (14) is adhesively joined to the glassrun (12) during the injection molding of the greenhouse trim (14).

4 Claims, 2 Drawing Sheets

INTEGRALLY MOLDED GREENHOUSE TRIM

FIELD OF THE INVENTION

This invention relates to an improved, molded plastic greenhouse trim for the glassrun component of an automotive vehicle. More particularly, this invention relates to a greenhouse trim that is joined to its associated glassrun during the molding of the greenhouse trim.

BACKGROUND OF THE INVENTION

U.S. Pat. Nos. 4,913,976 (Brooks et al.) and 5,014,464 (Dupuy et al.), each of which is assigned to the assignee of this application, describe a glassrun for an automotive vehicle. A glassrun is an elongate sealing member that surrounds the window opening in a door of the vehicle, and it has a linear opening, which is generally U-shaped in cross-section, that sealingly engages the periphery of the window of the door in the closed position of the window. The window is capable of being lowered and lifted within a track defined by the opening in the glassrun. The disclosures of the aforesaid U.S. Pat. Nos. 4,913,976 and 5,014,464 are incorporated by reference herein.

A glassrun is typically used with a trim member, called a greenhouse trim, which heretofore has been separately manufactured and installed from the glassrun. The greenhouse trim, which is usually a metallic or color coated component, outlines the glassrun and imparts an aesthetic appearance to the vehicle in the region of the window opening. During assembly of the vehicle, such a greenhouse trim is secured to the sheet metal of the vehicle by metal fasteners, and it must have a vinyl or similar seal to seal the junctures between the greenhouse trim and the vehicle, and between the greenhouse trim and the glassrun.

SUMMARY OF THE INVENTION

According to the present invention there is provided a greenhouse trim that is molded from a suitable polymeric material, and is integrally joined to its associated glassrun, which has previously been extruded from a polymeric material (or co-extruded from a multiplicity of polymeric materials to provide a glassrun with portions that vary in hardness from one another), during the molding of the greenhouse trim. The use of such a combined glassrun and greenhouse trim, or integrally molded greenhouse trim, reduces the number of components that must be stored in an automotive assembly plant, and it eliminates an assembly step in the assembly plant.

The integrally molded greenhouse trim of the present invention also inherently eliminates a gap that is characteristic of the glassrun greenhouse trim combinations of the prior art, and thereby reduces wind noise and the possibility of leakage of water that can occur in such a prior art device. Further, the use of a polymeric material in the manufacture of the greenhouse trim of the present invention can improve the color and appearance match between the glassrun and the greenhouse trim over corresponding qualities that can be achieved between a polymeric glassrun and a metallic greenhouse trim.

Accordingly, it is an object of the present invention to provide an improved greenhouse trim for the window opening of an automotive vehicle. More particularly, it is an object of the present invention to provide a greenhouse trim of the foregoing character that is molded from a polymeric material. Even more particularly, it is an object of the present invention to provide a greenhouse trim of the foregoing character that is integrally joined to its associated glassrun during the molding of the greenhouse trim.

For a further understanding of the present invention and the objects thereof, attention is directed to the drawing and the following brief description thereof, to the detailed description of the preferred embodiment of the invention and to the appended claims.

DETAILED DESCRIPTION OF THE PREFERRED EMBODIMENT

Figure 1:
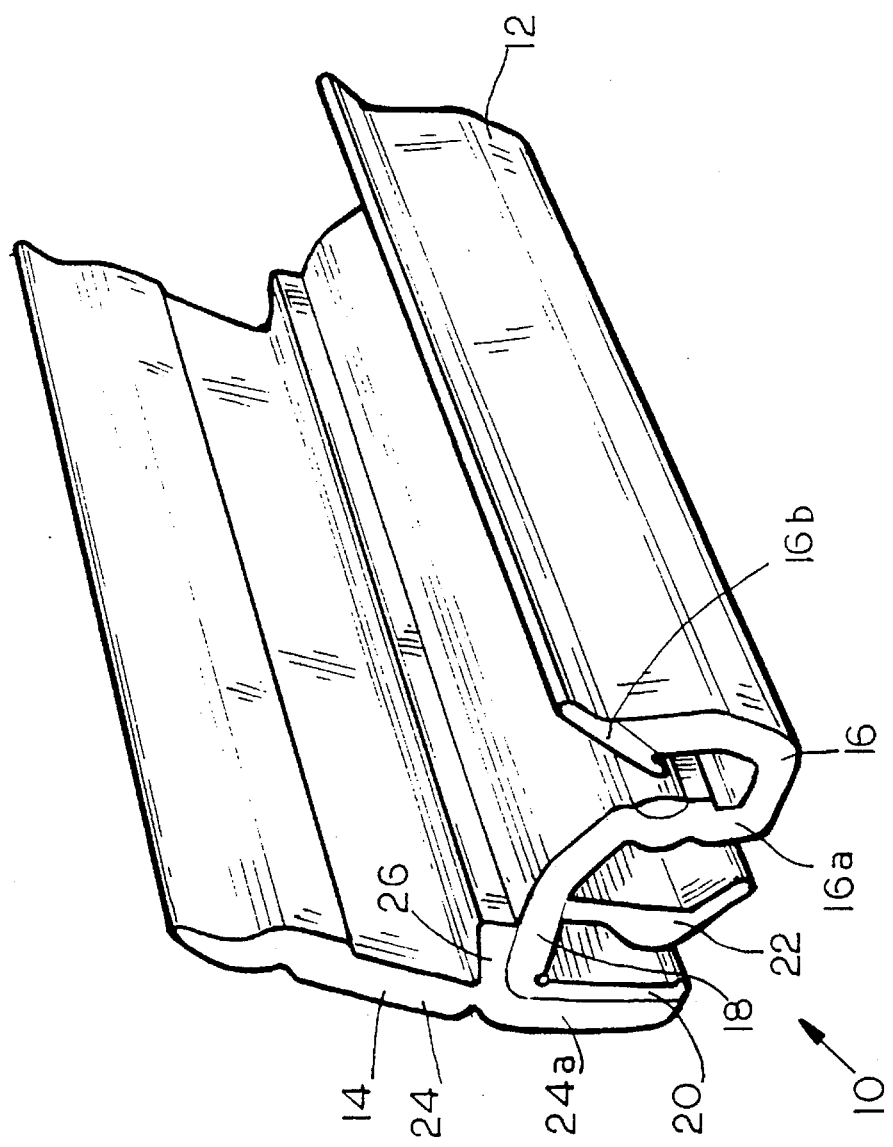
FIG. 1 is a fragmentary, perspective view of a combined glassrun, greenhouse trim according to the preferred embodiment of the present invention.

A combined glassrun, greenhouse trim for a window opening of an automotive vehicle is indicated generally by reference numeral 10 in FIG. 1, and is made up of a glassrun 12 with a greenhouse trim 14 integrally joined thereto in a manner that will be hereinafter described in greater detail. For functional purposes when installed on a vehicle, the glassrun 12 is preferably formed from a flexible, durable polymeric material, such as "EPDM," an elastomeric material generically described as a copolymer of ethylene and propylenediene. The glassrun 12 may be readily produced from EPDM in its illustrated, complex shape by extrusion. Preferably, the glassrun 12 is co-extruded from a multiplicity of polymeric materials to provide a product with portions that vary in hardness from one another in accordance with the teachings of the aforesaid U.S. Pat. No. 5,014,464. As it turns out, EPDM also has very suitable properties for the processing steps it must undergo in the manufacture of the combined glassrun, greenhouse trim 10 as hereinafter described.

The glassrun 12 has a generally U-shaped portion 16 that is adapted to slidingly and sealingly receive the edge, or an element secured to the edge, of a side window glass (not shown) of an automotive vehicle. The glassrun 12 also has a portion 18 that extends outwardly and generally transversely from a leg 16a thereof, an outermost flange portion 20 that extends transversely downwardly from the outer extremity of the portion 18, and an intermediate flange portion 22 that is spaced between and from the flange portion 20 and leg 16a of the U-shaped portion 16 and extends downwardly from the portion 18.

The flange portion 20 of the glassrun 12 serves to provide a surface against which the greenhouse trim 14 is joined, as hereinafter described, and the flange portion 22 serves to form, with the leg 16a of the U-shaped portion 16 and the portion 18, a pocket that permits the combined glassrun, greenhouse trim 10 to be secured to an edge of the window opening of an automotive vehicle (not shown).

The greenhouse trim 14 of the combined glassrun, greenhouse trim 10 may be formed from a variety of polymeric materials that have suitable functional properties when installed on a vehicle and are capable of being joined by molding to the glassrun 12, as hereinafter described. For functional purposes, such materials must be durable and relatively flexible, and they must have a pleasing external appearance or be capable of having a pleasing external appearance imparted thereto. 70–85 Shore A durometer EPDM material has the requisite functional properties for use in the manufacture of the greenhouse trim 14, and it can be readily post-coated with a cosmetic coating to meet the color and gloss requirements of typical automotive customers. Alternatively, the greenhouse trim 14 can be formed from a thermoplastic material, such as polypropylene, or a thermoplastic elastomer, such as SANTOPRENE (an alloy of EPDM and polypropylene or a thermoplastic olefin), and these materials have processing advantages over EPDM in that they have shorter cycle times because they do not require curing as do thermosetting materials such as EPDM.

The greenhouse trim 14 is generally T-shaped, with an elongate top portion 24 and a short stem portion 16 extending inwardly and transversely from the top portion 24. An outer surface of the flange portion 20 of the glassrun 12 engages an inner surface of the lower portion 24a of the top portion 24 of the greenhouse trim 14, and the underside of the stem portion 26 of the greenhouse trim 14 engages an outer portion of the upper surface of the portion 18 of the glassrun 12.

Figure 2:
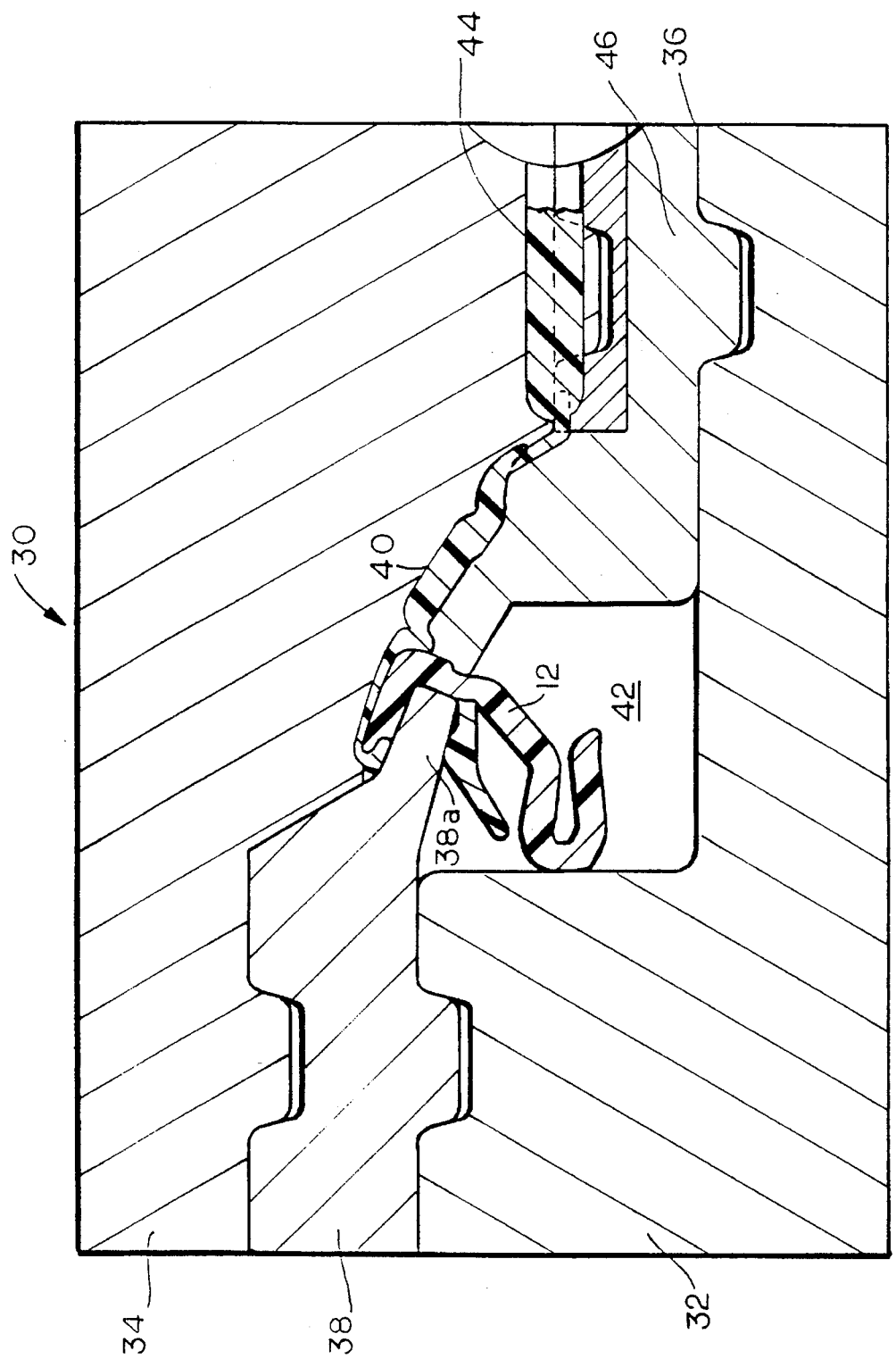
FIG. 2 a cross-sectional view of an injection mold used in the manufacture of the combined glassrun, greenhouse trim of FIG. 1.

The combined glassrun, greenhouse trim 10 is produced by injection molding the greenhouse trim 14 against a portion of a previously formed glassrun 12 by molding apparatus generally indicated by reference numeral 30 in FIG. 2. The molding apparatus 30 is made up of a lower molding member 32 and an upper molding member 34, which are movable with one another by sliding or by pivoting about a pivot location 36. The molding apparatus 30 further includes an insert 38 that is positioned between, and in engagement with, the lower molding member 32 and the upper molding member 34 in the closed position of the molding apparatus 30, as depicted in FIG. 2, it being noted that the insert 38 can also be a part of the lower molding member 32, and an insert 46 that is positioned between the upper molding member 34 and the lower molding member 32.

The lower molding member 32, the upper molding member 34, the insert 38 and the insert 46 are configured to define a mold cavity 40 in the desired shape of the greenhouse trim 14 and a second cavity 42, which is sealed from the mold cavity 40 by the insert 38 and the insert 46 when a glassrun 12 is inserted in the closed molding apparatus 30. The portion of the glassrun 12, from an outer surface of the flange portion 22 through the U-shaped portion 16, is received in the mold cavity 42, and the outer flange portion 20 of the glassrun 12 is received in the mold cavity 40, the space between the outer flange portion 20 and the flange portion 22 receiving a portion 38a of the insert 38 to rigidly support the outer flange portion 20 of the glassrun 12 during the molding of the greenhouse trim 14.

Molten polymeric material of the type selected for the greenhouse trim 14 is injected under pressure into the mold cavity 40 through a passage 44 in the upper molding member 34 in a conventional manner. After the cavity 40 has been filled with such polymeric material, which will adhesively bond to the exposed surfaces of the glassrun 12, and after the molten polymeric material has cooled sufficiently to be self-supporting, the molding apparatus 30 is opened and a product corresponding to the combined glassrun, greenhouse trim 10, but for any excess material used in molding the greenhouse trim 14 element thereof, which may be trimmed away in a known manner, is then removed from the molding apparatus 30.

When the glassrun 12 is produced from a plurality of polymers by co-extrusion, as described above, preferably polymers are selected to provide a sealing lip portion 16b of the U-shaped portion 16 and the intermediate flange portion 22 with a hardness of approximately 70 Shore A durometer, and the balance of the U-shaped portion 16, the portion 18 and the outermost flange portion 20 with a hardness of approximately 90 Shore A durometer.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. A combined glassrun, greenhouse trim for a window opening of an automotive vehicle, comprising:

a glassrun comprising an extruded molded polymeric material, said glassrun having a flange portion that is adapted to have a polymeric greenhouse trim member injection molded thereagainst; and a greenhouse trim comprising an injection molded second polymeric material, said greenhouse trim being injection molded and mold bonded against said flange portion of said glassrun after the injection molding of said glassrun.

2. A combined glassrun, greenhouse trim according to claim 1 wherein:

said second polymeric material is EPDM; and said polymeric material is selected from the group consisting of EPDM having a durometer of approximately 70–85 Shore A, polypropylene, EPDM-polypropylene alloy and thermoplastic alloy.

3. A combined glassrun, greenhouse trim according to claim 1 wherein:

said glassrun further having a linear portion that is generally U-shaped in cross-section, said linear portion being adapted to sealingly receive the edge, or an element secured to the edge, of a side window glass of an automotive vehicle.

4. A combined glassrun, greenhouse trim according to claim 3 wherein said glassrun is co-extruded from a multiplicity of polymers to provide a glassrun with portions that vary in hardness from one another.

* * * * *